US007236844B1

(12) United States Patent
Bai et al.

(10) Patent No.: US 7,236,844 B1
(45) Date of Patent: Jun. 26, 2007

(54) WEB ACCESSIBLE REAL TIME SYSTEM AND SOFTWARE FOR AGILE AND LEAN MANUFACTURING

(75) Inventors: Xue Bai, Las Vegas, NV (US); Zhiyong Wang, Las Vegas, NV (US)

(73) Assignee: Simple Technology, Inc, Las Vegas, NV (US)

( * ) Notice: Subject to any disclaimer, the term of this patent is extended or adjusted under 35 U.S.C. 154(b) by 0 days.

(21) Appl. No.: 11/307,907

(22) Filed: Feb. 27, 2006

(51) Int. Cl.
*G06F 19/00* (2006.01)

(52) U.S. Cl. .................... 700/100; 700/107; 705/8; 705/29

(58) Field of Classification Search ................ 700/99, 700/100, 106, 107; 705/8, 28, 29
See application file for complete search history.

(56) References Cited

U.S. PATENT DOCUMENTS

| 4,815,190 | A  | * | 3/1989  | Haba et al. ............... 29/430 |
| 6,236,901 | B1 | * | 5/2001  | Goss ..................... 700/95  |
| 6,259,959 | B1 | * | 7/2001  | Martin ................... 700/99  |
| 6,345,259 | B1 | * | 2/2002  | Sandoval .................. 705/7  |
| 6,442,528 | B1 | * | 8/2002  | Notani et al. .............. 705/9 |
| 6,502,301 | B1 | * | 1/2003  | Guner et al. ............. 29/771 |
| 6,684,121 | B1 | * | 1/2004  | Lu et al. ................. 700/108|
| 6,826,518 | B1 | * | 11/2004 | Ivezic et al. .............. 703/6 |

* cited by examiner

*Primary Examiner*—Ryan A. Jarrett

(57) ABSTRACT

The present invention is directed to Lean and Agile methods and their applications to manufacturing operations on production floors. A web assessable, modular, user modifiable, and graphically-enriched system and software is disclosed in this document. It provides real time Lean and Agile solutions to reduce production wastes and to enhance productivity and efficiency for manufacturing organizations.

9 Claims, 2 Drawing Sheets

WEB ACCESSIBLE REAL TIME SYSTEM AND SOFTWARE FOR AGILE AND LEAN MANUFACTURING

TECHNICAL FIELD OF THE INVENTION

The present disclosure relates generally to methods and systems for Agile and Lean manufacturing (named as AgiLean in this disclosure), and in particular, to a web assessable, modular, user modifiable, and graphically-enriched system and software, which provides real time Lean and Agile solutions to making shop floor production easier, faster, high in quality, and low in cost.

PRIOR ART

Since 1960's, strong industry demands for improving productivity quickly drove the Enterprise Resource Planning (ERP) applications from virtually nil into a 70 billion dollar plus business in the United States alone. ERP, which evolved from Material Requirement Planning (MRP) and Manufacturing Resource Planning (MRP II) systems, incorporates major business activities, such as administrative, human resource, and payroll function, with supply chain management, inventory control, and some manufacturing duties.

Unfortunately, up till now, most ERP systems cannot work effectively at the plant level. They often have difficulty integrating business functions with those involving manufacturing operations on the shop floor since most of them started from UNIX or PC based financial applications that were modified to include logistics and, often as an afterthought, attempted to provide some plant solutions.

In existing ERP production models, the key calculation underlying ERP is performed by using fixed lead times to "back out" releases from due dates. These lead times are functions only of the part number and are not affected by the status of the plant. In particular, lead times do not consider the loading of the plant and the morale of its employees. An ERP shop production system assumes that the time for a part to travel through the plant is the same whether the plant is empty or overflowing with work, which is only true if the plant capacity is infinite. Since all plants have finite capacity, the fixed-lead-time assumption is always a rough approximation of reality for a typical mass production system. Moreover, because releasing jobs too late can destroy the desired coordination of parts at assembly or cause finished products to come out too late, there is a strong incentive to inflate the ERP lead times to provide a buffer against all the contingencies that a part may have to contend with (waiting behind other jobs, machine outages, etc.). The net effect is that ERP, touted as a cutting-edge tool to reduce inventories and improve customer service, can actually make these two objectives worse.

The above analyses reveal why ERP can support production management, but may not significantly reduce inventory and improve shop productivity. It was the lean manufacturing movement in the U.S. manufacturing organizations, the practices of Just-In-Time (JIT), seven zeros (zero defects, zero lot size, zero setups, zero breakdowns, zero handling, zero lead time, and zero surging), pull system, and production Kanban, that finally reduced inventory and consequently increased the inventory turns in the 1990s. There are plenty of patents applied in this filed and among them, U.S. Pat. No. 4,815,190 discloses the use of automated and manual kitting stages in continuous flow manufacturing; U.S. Pat. No. 6,236,901 provides parallel organized unit-by-unit manufacturing method for build-to-order assembly environment; U.S. Pat. No. 6,826,518 simulates behaviors of manufacturing process on a single-processor computer to achieve Lean Manufacturing results; U.S. Pat. No. 6,259,959 discloses a method for determining the performance components of a manufacturing line; U.S. Pat. No. 6,345,259 provides a system for integrating business and manufacturing environments; U.S. Pat. No. 6,684,121 discloses an event driven method and system for receiving, converting, tracking and publishing work-in-progress status created from manufacturing execution systems; U.S. Pat. No. 6,502,301 reveals an alignment-based rigid-body manufacturing system and method in which manufacturing operations are categorized in generic categories of dynamically occurring alignments of core operations; and U.S. Pat. No. 6,442,528 discloses an exemplar workflow for use in the design and deployment of a workflow for multi-enterprise collaboration.

Lean manufacturing movement has revitalized thousands of U.S. plants that once were no longer profitable under international competition, and is still playing a pivotal role in enhancing competitiveness of thousands more U.S. companies. Many researchers predict the fall of mass production era and the rise of lean manufacturing epoch as a major event in the human production history. However, it is surprising to know that the lean practice in U.S. manufacturing organizations is generally performed by verbal communication and paperwork. There is little, if any, mathematical models developed to support the lean practice.

SUMMARY OF THE INVENTION

The present invention (AgiLean) provides methods and systems for a web assessable, modular, user modifiable, and graphically-enriched system and software, which provide real time Lean and Agile production information and solutions to the right persons at the right time in the right formats and at the right locations on the production floor and any other secure sites with web connections.

AgiLean comprises of multiple functional software modules, such as Configuration software module, Administration software module, Shop Layout Designer (SLD) software module, Master Production Schedule (MPS) software module, Bill of Materials (BOM) software module, Workflow Designer (WFD) software module, Shop Floor Control (SFC) software module, Lean Warehouse Designer (LWD) software module, Manufacturing Cells Designer (MCD) software module, Lean Engine (LE) software module, Agilean Mobile (AM), etc. Each module, except the Configuration software module, can work independently in a work environment without the installation of any other modules stated above and perform its tasks on manufacturing.

Nevertheless, any combinations of the above stated software modules can be integrated together either at the same time or at different times into one combined software package by using the Configuration software module. The joint software package shares common database and performs tasks of all modules involved.

BRIEF DESCRIPTION OF THE DRAWINGS

In order to better understand the invention and to illustrate it in practice, non-limiting examples of some preferred embodiments will now be described, with reference to the accompanying drawings, in which.

DETAILED DESCRIPTION OF THE PREFERRED EMBODIMENT

Figure 1:
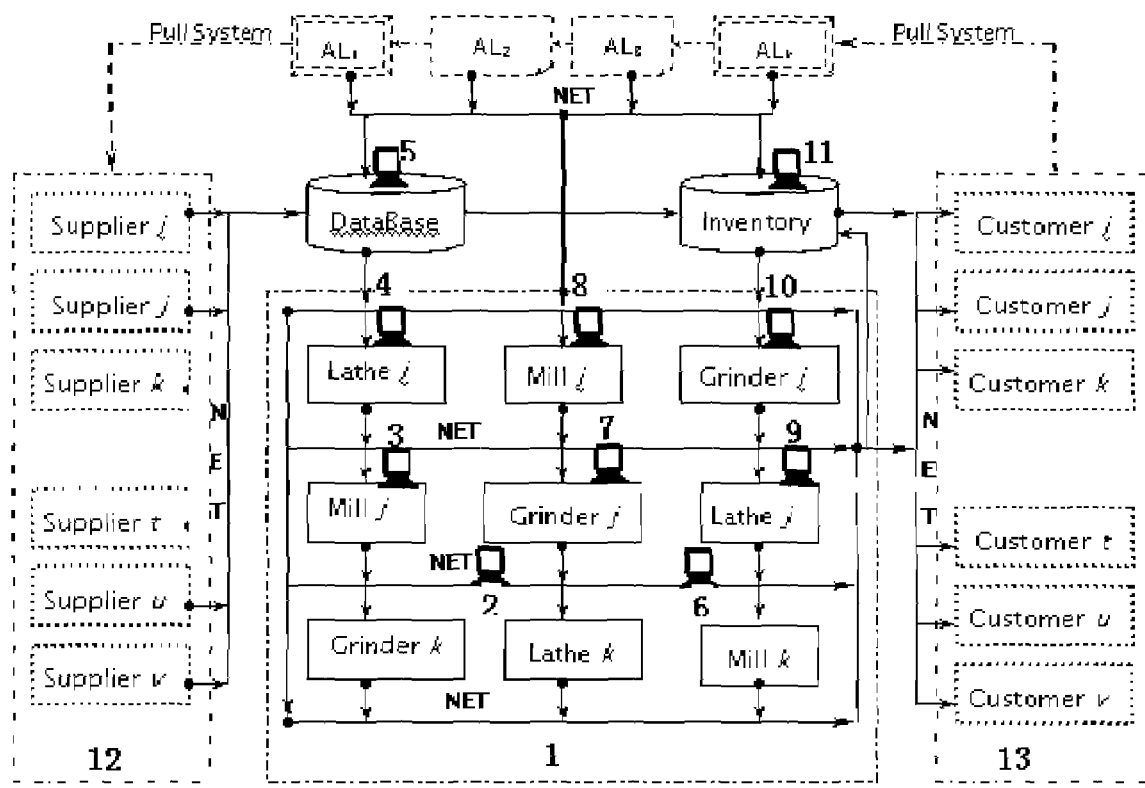
FIG. 1 is a block diagram illustration of the web accessible real time system of AgiLean.

FIG. 1 schematically illustrates a production site 1 for producing a variety of products with machines of lathes l, j, k, mills l, j, k, and grinders l, j, k, for example. AgiLean modules $AL_1, AL_2, AL_3 \ldots AL_k$ are either installed in the production environment or provided to the production site via a web server. Computers at various work locations 2, 3, 4, 5, 6, 7, 8, 9, 10, and 11 are Internet connected and are either placed at each work step, or shared between production steps. AgiLean also connect suppliers 12 and customers 13 via Internet.

Figure 2:
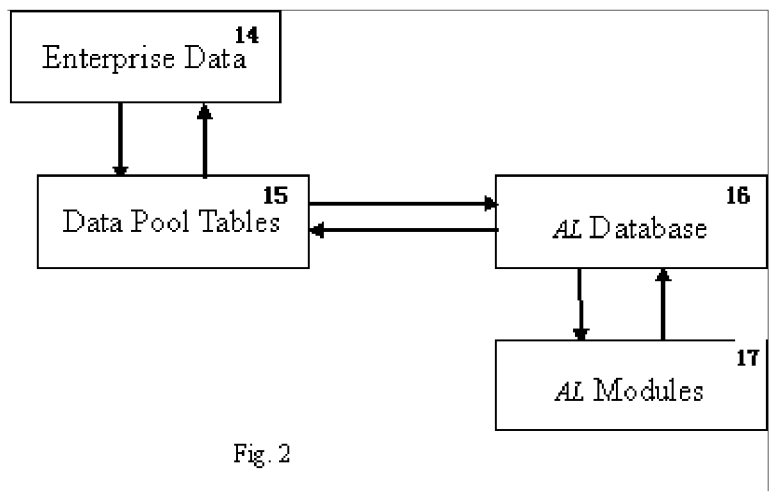
FIG. 2 is a flow chart illustration of system data flow of AgiLean.

FIG. 2 illustrates system data flow of AgiLean, where dynamic data generated during production in an enterprise 14 are preserved in AgiLean database 16 through data pool 15. Specific AgiLean modules 17 are called during production and information pertain to that production activity are obtained through AgiLean database 16.

Figure 3:
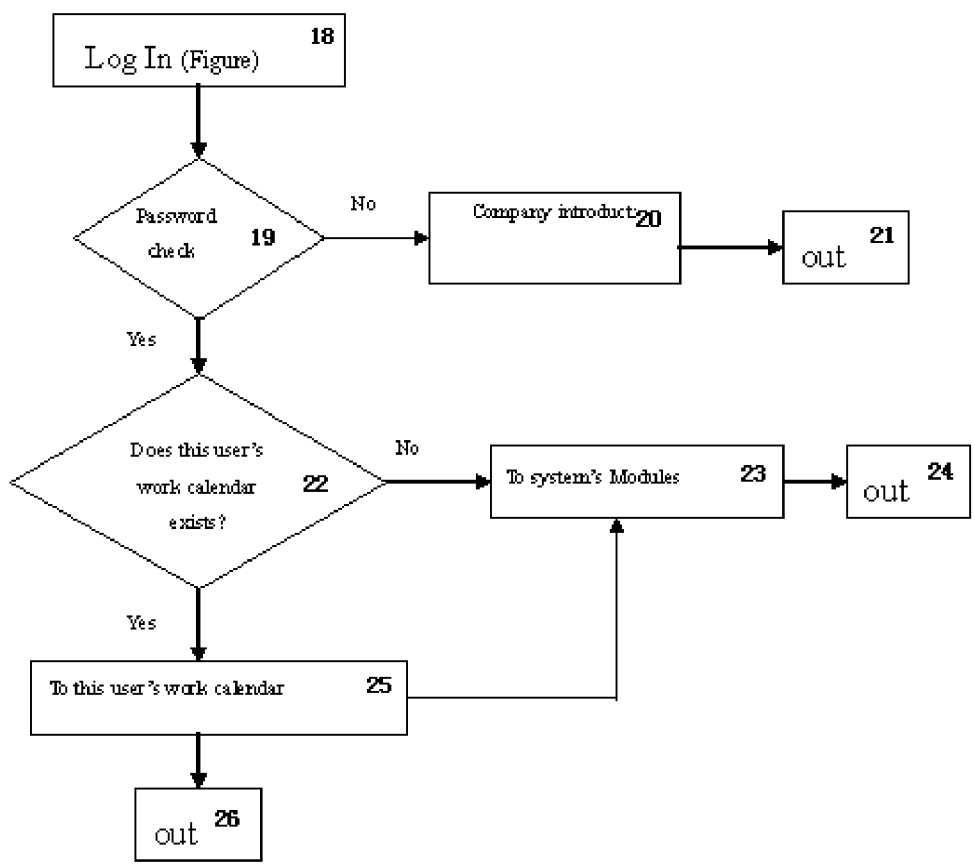
FIG. 3 is a flow chart illustration of system flow of AgiLean at the starting point.

FIG. 3 outlines system logic flow of AgiLean when a user starts the system. The Log-In function 18 in FIG. 3 validates user's authenticity 19. If a user is not able to provide a correct password 20, the system gives "Not Authorized User" message and then goes to company/product introduction pages 21. If the user is validated as an authorized user through password verification 22, his/her employee calendar 23 will be loaded as default template on the computer screen. If his/her employee calendar does not exist, then AgiLean goes to Administration software module 23.

This invention (AgiLean) has a Configuration software module, its functions are three (3) fold; one is to enable users easily to integrate any other functional software modules that they purchased separately from this invention as one software system by simply clicking buttons provided in the configuration module; two is to provide interfaces to connect other commercially available ERP software, and; three is to enable database connection to any separately purchased functional software modules from the system.

This invention (AgiLean) has an Administration software module, which can work independently as a commercial software package and can also be integrated with other software modules provided by this invention through the Configuration software module described above to become one software package.

Its functions are six (6) fold. One is to provide a software tool to create an organization chart for a business in three (3) interchangeable formats: tree structure view, graphic view, and table view. Unlike most other organization chart creation software that texts, data, and images are handled on one graphical layer, this invention provides different layers for text, data, and images, and moreover are supported by a database. All texts, images, data, and relationship among people on the organization chart are saved in the database, which significantly enhance the capability and function of this invention.

Function two of this Administration software module is to provide four (4) types of calendar for users; they are Job Calendar, Employee Calendar, Shop Calendar, and Equipment/Tool Calendar. All calendars can be viewed in daily mode, weekly mode, and monthly mode. Daily mode provides detailed assignment for each day, weekly mode provides brief work summary for the week, and monthly mode illustrates brief work summary for the month.

Job Calendar keeps record of job assignments and actual performance of a project on each workday on the calendar with hours as one axis and job (or performance) as the other axis of the coordinates. The job assignment includes job start time, finish time, specific equipment need, tool need, material need, etc. Performance record includes actual job start time, finish time, quality, and comments.

Employee Calendar keeps record of job assignments and actual performance of each employee on each workday on the calendar with hours/minutes as one axis and job (or performance) as the other axis of the coordinates. The job assignment includes job starting time, finish time, specific equipment need, tool need, material need, etc. Performance record includes actual job starting time, finish time, quality, and comments.

Shop Calendar keeps record of job assignments and actual performance of a shop (or a division/department) on each workday on the calendar with hours as one axis and job (or performance) as the other axis of the coordinates. The job assignment includes job start time, finish time, specific equipment need, tool need, material need, etc. Performance record includes actual job start time, finish time, quality, and comments.

Equipment/Tool Calendar is created automatically by the software after Job Calendar, Shop Calendar, and Employee Calendar are filled. The reservation and actual usage of equipment, tool, and materials are illustrated in the Equipment/Tool Calendar.

All four (4) types of calendars are data connected through a commonly shared database and job linked to each other. Warning signs are given on the calendars if there is any assignment conflict in employee, equipment, tool, or material assignment, etc. Once a machine, equipment, tool, or material is reserved by one employee for a certain job at a given time. No other employee can reserve the same machine, equipment, tool, or material for a different (or the same) job at the same time unless they are defined as "sharable" value. By clicking on a job assignment on the job Calendar or a Shop Calendar, authorized managers/supervisors can view related Employees Calendars, assign projects to employee(s) on their calendars, and evaluate employee/tool/equipment performances on the calendars.

Function three of this Administration software module is to set up User Rights, i.e. user permission for access restricted functions provided in the software package. Organization Chart provides job position for each employee in the business, User Rights function defines what information templates are permitted to view, to write, and to edit to each employee.

Function four of this Administration software module is Equipment/Tool Manager, which provides a list of machines, equipment, and tools available in the organization. The data are stored in a database and used by many software modules of this invention.

Function five of this Administration software module is Form Designer, which provides users an easy tool to design business letter head, table, and form in a format that they desire.

Function six of this Administration software module allows users to self define special functions with this module and adapt it to their unique business need.

This invention (AgiLean) has a Shop Layout Designer (SLD) software module, which can work independently as a commercial software package and can also be integrated with other software modules provided by this invention through the Configuration software module described above to become one software package.

One of the functions of SLD software module is to provide a database-driven shop layout design tool, which use symbols, images, and building blocks pre-stored in the software tool box to create a shop layout drawing for a user predominately by clicking on a symbol/image/building block from the tool box and then drop it off in the main design window provided by the SLD software module. Machine, equipment, tool, material, and worker, etc. can all be illustrated on the shop layout drawing and their information are all stored in a common database, which provides a solid foundation for production planning and optimization.

The second function of SLD software module is to estimate space requirement for workstations on the production floor, which includes space for machines, receiving and storage, waste removal area, tool area, machine area, personnel area, and active space need for a project on each production step, etc.

The third function of Shop Layout Designer software module is to estimate department shape & space requirement, which includes main aisle design, departmental aisle design, and utility area design, etc. SLD software module also provides database-based functions for multi-floor facility layout design and safety flensing design.

This invention (AgiLean) has a Master Production Schedule (MPS) software module, which can work independently as a commercial software package and can also be integrated with other software modules provided by this invention through the Configuration software module described above to become one software package.

The functions of MPS software module are to provide information on the products to be manufactured, when they should be completed, and in what quantities. Web-based lean manufacturing eBoards (kanban) are provided to show the real time status of every production project, market estimates, customer order, volume-variety chart, scrap estimates, and reject allowance, etc.

This invention (AgiLean) has a Bill of Materials (BOM) software module, which can work independently as a commercial software package and can also be integrated with other software modules provided by this invention through the Configuration software module described above to become one software package.

The function of BOM software module lists component parts and subassemblies that make up each product. It is used to compute the requirements for raw materials and components used in the end products given in the MPS module. Web-based lean manufacturing eBoards (Kanban) are provided to illustrate BOM for all products in three ways: tree view, graphical view, and table view. Exploded part drawings and exploded assembly drawing are linked to the eBoards. Engineering Change Requests (ECR) eBoards (Kanban) are provided to keep tracks of all changes made to the product and who approved the changes. Costs for all parts are provided to the authorized viewers. A Make-or-Buy Decision eBoard is given to plant managers assisting them to make production or purchasing decision on each part.

This invention (AgiLean) has a Workflow Designer (WFD) software module, which can work independently as a commercial software package and can also be integrated with other software modules provided by this invention through the Configuration software module described above to become one software package.

The functions of WFD software module are creating database-supported Route Sheet, Assembly Chart, Bill-Of-Operation (BOO) Chart, Precedence diagram, and Quantitative flow measurement (distance), etc. It provides all manufacturing operations to be performed on the workpart and listed on eBoard (kanban) in the proper order in which they are to be accomplished.

Operation eSheet (kanban) for each process is also created which provides more details such as time standards for each operation, lead times, costs, inspection requirement, and tools. A production team member can follow the instructions/suggestions provided on the Operation eSheet for the specific process that he/she is working on. Simply by clicking on (or touching) the graphical images on the computer screen, WFD software module will record the actual production time, lead time, quantity, and quality status of that step of operation. Data are analyzed and used immediately as guidelines for the next production activity of the same worker.

This function is significantly different from most existing ERP systems that consider lead times as attribute of the parts, which inflates planned lead times and leads to longer flow times. This artifact has been perpetuated to the present day and lies at the heart of the materials management module of the most popular and comprehensive ERP systems today.

This invention (AgiLean) has a Shop Floor Control (SFC) software module, which can work independently as a commercial software package and can also be integrated with other software modules provided by this invention through the Configuration software module described above to become one software package.

The functions of SFC software module are Order Release, Order Scheduling, Order Progress and Analysis. Order release generates material requisition sheet, job card, move ticket, and part list in paper and/or in electronic format. Order scheduling assigns the production orders to each machine and assembly station on the shop floor by using visual shop layout function, shop calendar function, equipment fractions calculation, total equipment requirements, multiple activity chart (human-machine chart), Gantt chart, forward scheduling, and backward scheduling. Order progress is to monitor the status of the orders, work in progress, exception, and other parameters in the plant that indicate process and production performance. And Analysis function compares actual performance with planned schedules, providing statistic analyses, which can be used for improving future production activities and quick rough estimates for future projects. With the assistance of Lean Engine module, it also provides lean and agile manufacturing analyses, such as, part time study, takt time, production rate, production capacity, availability, manufacturing lead time (MLT), WIP, Fixed costs, variable costs, direct labor cost, material cost, overhead costs, factory overhead rate (FOUR), corporate overhead rate (COHR), breakdown cost chart, machine annual cost, cost as function of production output, and WIP inventory cost, etc.

This invention (AgiLean) has a Lean Warehouse Designer (LWD) software module, which can work independently as a commercial software package and can also be integrated with other software modules provided by this invention through the Configuration software module described above to become one software package.

The functions of LWD software module are warehouse location optimization, warehouse shape/size optimization, shelf location optimization, item location optimization, and delivery route optimization, etc.

This invention (AgiLean) has a Manufacturing Cells Designer (MCD) software module, which can work independently as a commercial software package and can also be integrated with other software modules provided by this invention through the Configuration software module described above to become one software package.

The functions of MCD are cell design with direct clustering algorithm, machine utilization, and grouping efficiency, etc.

This invention (AgiLean) has a Lean Engine (LE) software module, which can work independently as a commercial software package and can also be integrated with other software modules provided by this invention through the Configuration software module described above to become one software package.

The functions of LE software module are valume stream mapping (VSM), part time study, takt time, production rate, production capacity, availability, manufacturing lead time (MLT), WIP, Fixed costs, variable costs, direct labor cost, material cost, overhead costs, factory overhead rate (FOUR), corporate overhead rate (COHR), breakdown cost chart, machine annual cost, cost as function of production output, and WIP inventory cost, etc.

This invention (AgiLean) has an Agilean Mobile (AM) software module, which can work independently as a commercial software package and can also be integrated with other software modules provided by this invention through the Configuration software module described above to become one software package.

The functions of AM software module are to provide key production information in real (or almost real) time from/to the production floor to/from mobile devices, such as PDA, cell phone, laptop, etc.

Most existing ERP systems considers lead time as attribute of the parts, which inflates planned lead times and leads to longer flow time. This artifact has been perpetuated to the present day and lies at the heart of the materials management module of the most popular and comprehensive ERP systems today. This invention (AgiLean) could record actual production time, lead time, quantity, and quality status of each operation step with WFD and/or SFC software modules. Data are immediately analyzed by Value Stream Mapping (VSM) and other functions of the LE module for further improvement and suggestions on how to reduce wastes on production time, lead time, quantity, and quality are given to workers and production managers before the next production activity. Therefore, this invention is fundamentally different from most existing ERP systems in lead time treatment.

This invention provides real (or almost real) time inventory status at each step on the shop floor with its SFC module. Web-based templates (kanban) show work in progress and inventory dropping rates for all raw materials and parts used in production. Company top managers, plant managers, purchasing department personnel, and permitted suppliers can all get real (or almost real) time inventory information via Internet. Suppliers can better manage their shipment schedules to ensure materials are delivered just in time, which bring tremendous saving to the manufacturing company because inventory usually accounts for ⅓ of the business costs. The Web-based SFC system will also save costs for the suppliers too since they can precisely schedule their production time and their supply needs.

This invention provides real time work-in-progress status of shop floor production to customers via Internet with its SFC module. With permission, customers may login to the SFC system via Internet and view production progress at any time. Customers know exactly how many products they ordered have been built, how many are being built on the shop floor, and how many are still on the planning table. They may be permitted to view quality reports and shipment schedules too. Therefore, customers can make early but accurate planning of those products even before they are produced.

Once a customer order or inquiry is given, recommended production flow models with detailed information regarding each machine, each assembly station, and each worker involved in the project are generated by the Web-based SFC software module of this invention. A sales man/woman of the company can immediately provide a potential customer with delivery time, quantity, and expected quality for the order/inquiry with the assistance of the Web-based SFC system no matter where he/she is in the world as long as there is Internet connection available. The Web-based system will enable the sales people receive latest information regarding load status on the shop floor. Therefore, he/she can provide accurate and rapid responses to customers. In the mean time, company top managers and plant managers are able to see those inquiries, and are informed periodically with the development via Internet notice boards. Once an order is placed, the SFC software module immediately decomposes the product into order release and order schedule for the plant managers. As production proceeds, the SFC software module will generate real time order progress reports to all permitted viewers. With the powerful support of the Web-based SFC software system, company top managers are updated about incoming orders, production status, machine loading status, and employee performance in almost real time no matter they are in the company or traveling outside.

Unlike most existing office tool software, the drawings generated for calendars, shop layouts, and organization charts are static graphics, this invention provides "clickable" drawings in all software modules of this invention. Common databases are used to support the drawings with in-depth modifiable information.

What is claimed is:

1. An AgiLean system comprising:
   (a) a multiple-function software package, tangibly embodied on a computer-readable memory, consisting of the following modules: Administration software module, Shop Layout Designer (SLD) software module, Master Production Schedule (MPS) software module, Bill of Materials (BOM) software module, Workflow Designer (WFD) software module, Shop Floor Control (SFC) software module, Lean Warehouse Designer (LWD) software module, Lean Engine (LE) software module, and Agilean Mobile (AM) software module;
   (b) wherein each module can work independently in a work environment and perform its tasks on manufacturing related activities.

2. An AgiLean system according to claim 1 wherein the system is capable of recording data comprising actual production times, lead times, quantities, and quality status of each operation step with its WFD and/or SFC software modules in real (or almost real) time.

3. An AgiLean system according to claim 2 wherein the data are immediately analyzed by a Value Stream Mapping (VSM) and other functions of said LE module for further improvement and suggestions on how to reduce wastes on production times, lead times, quantities, and quality are given to workers and production managers before the next production activity.

4. An AgiLean system according to claim 3 wherein said system provides real (or almost real) time inventory status at each step on the shop floor with its SFC module; web-based templates (kanban) show work in progress and inventory dropping rates for all raw materials and parts used in production; company personnel, and permitted suppliers can all get real (or almost real) time inventory information via secure internet connections; and enabling suppliers to better manage their shipment schedules to ensure materials are delivered just in time.

5. An AgiLean system according to claim 4 wherein said system provides real time work-in-progress status of shop floor production to customers via secure internet with its SFC module; allows customers with given permissions to login to the SFC system via secure internet to view certain production progress at any time; allows customers to know exactly how many products they ordered have been built, how many are being built on the shop floor, how many are still on the planning table; and to view quality reports and shipment schedules.

6. An AgiLean system according to claim 5 wherein recommended production flow models with detailed information regarding each machine, each assembly station, and each worker involved in the project are generated and provided by the Web-based SFC software module.

7. An AgiLean system according to claim 6 wherein said system provides a sales person of the company an accurate tool to provide a potential customer with delivery time, quantity, and expected quality for the order/inquiry with the assistance of the Web-based SFC system no matter where he/she is in the world as long as there is secure internet connection available.

8. An AgiLean system according to claim 7 wherein said system provides: once an order is placed, the SFC software module immediately decomposes the product into order release and order schedule for the plant managers with (or without) the assistance of other modules; as production proceeds, the SFC software module generates and provides real time order progress reports to all permitted viewers; with said Web-based SFC software system, company top managers can update incoming orders, production status, machine loading status, and employee performance in almost real time no matter if they are in the company or traveling outside.

9. An AgiLean system according to claim 1 wherein said system provides clickable drawings in all software modules; and common databases are used to support the drawings with in-depth modifiable information.

* * * * *